(12) United States Patent
De Filippis

(10) Patent No.: US 6,847,149 B2
(45) Date of Patent: Jan. 25, 2005

(54) BRUSHLESS MOTOR

(75) Inventor: Pietro De Filippis, Milan (IT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/281,532

(22) Filed: Oct. 28, 2002

(65) Prior Publication Data

US 2003/0107290 A1 Jun. 12, 2003

Related U.S. Application Data

(63) Continuation of application No. PCT/EP01/04741, filed on Apr. 26, 2001.

(30) Foreign Application Priority Data

Apr. 28, 2000 (IT) ..................................... TO2000A0401

(51) Int. Cl.$^7$ ............................. H02K 21/12; H02K 1/00
(52) U.S. Cl. ....................... 310/216; 310/254; 310/257; 310/258
(58) Field of Search ................................ 310/216, 254, 310/257, 258

(56) References Cited

U.S. PATENT DOCUMENTS

| | | | | |
|---|---|---|---|---|
| 4,700,097 A | * | 10/1987 | Kawada et al. | 310/162 |
| 4,712,035 A | * | 12/1987 | Forbes et al. | 310/218 |
| 4,998,032 A | | 3/1991 | Burgbacher | 310/51 |
| 5,170,083 A | * | 12/1992 | Burgbacher | 310/254 |
| 5,260,620 A | * | 11/1993 | Morrill | 310/254 |
| RE35,763 E | * | 4/1998 | Burgbacher | 310/254 |
| 5,744,893 A | * | 4/1998 | Zhao et al. | 310/216 |

FOREIGN PATENT DOCUMENTS

| | | | |
|---|---|---|---|
| DE | 1 488 353 | 7/1969 | |
| DE | 37 23 099 A1 | 1/1989 | .......... H02K/21/22 |
| DE | 3730615 A1 | 3/1989 | .......... H02K/21/06 |
| DE | 41 39 843 C1 | 6/1993 | .......... H02K/21/14 |
| DE | 694 09 889 T2 | 12/1998 | ............ H02K/1/27 |
| EP | 0 107 317 A1 | 9/1983 | .......... H02K/21/08 |
| EP | 0 598 137 A1 | 6/1993 | .......... H02K/21/14 |
| JP | 60152240 | 10/1985 | ............ H02K/1/24 |

* cited by examiner

Primary Examiner—Tran Nguyen
Assistant Examiner—J. Aguirrechea
(74) Attorney, Agent, or Firm—Baker Botts L.L.P.

(57) ABSTRACT

The motor (10) has a rotor (2) which can rotate around a rotation axis (A), and a specific number (N1) of magnetic poles (12). Furthermore, the motor (10) has a stator (4) which is arranged coaxially with respect to the rotor (2) and has three stator teeth (5) for each two magnetic poles (12), which stator teeth (5) are distributed uniformly around the rotation axis, with center points of mutually adjacent stator teeth (5) being separated from one another by one slot pitch (Pc). The stator teeth (5) have free surfaces (Ss') which are opposite the magnetic poles (12). Each stator tooth (5) is provided with one, and only one, projecting element (14), which extends radially from the respective free surface (Ss') in the direction of the rotor (2).

17 Claims, 5 Drawing Sheets

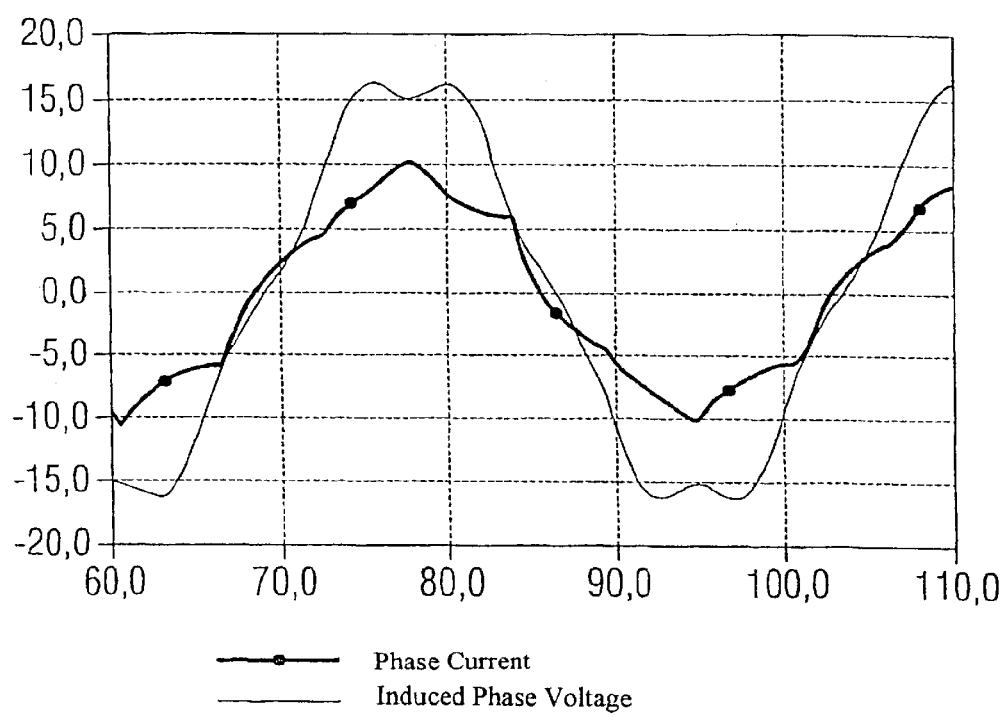

BRUSHLESS MOTOR

CROSS REFERENCE TO RELATED APPLICATION

This application is a continuation of copending International Application No. PCT/EP01/04741 filed Apr. 26, 2001, which designates the United States, and claims priority to Italian application number TO2000A000401 filed Apr. 28, 2000.

BACKGROUND OF THE INVENTION

The present invention relates to a brushless motor having magnetic poles. In particular, the present invention relates to a brushless three-phase motor having permanent magnets, comprising a rotor which can rotate around a rotation axis and has a specific number of magnetic poles, and a stator which is arranged coaxially with respect to the rotation axis and the rotor. The stator has three stator teeth for each two poles, which stator teeth are distributed uniformly around the rotation axis. The stator teeth form slots which are arranged between them. The distance between the center points of mutually adjacent stator teeth defines a slot pitch.

As a rule, the stator teeth are distributed in periodic groups depending on the number of motor phases. Each individual tooth is provided with a concentric winding (single-tooth winding).

FIG. 1 shows such a motor from the prior art, wherein the stator comprises nine stator teeth, which are subdivided into three periodic groups. The stator is arranged concentrically around the rotor. The rotor is provided with six magnetic poles, which each extend along one slot pitch. Furthermore, each magnetic pole has a radius of curvature which is smaller than the radius of curvature of a cylindrical surface which encloses the rotor itself, in order that the induced electromotive force is as sinusoidal as possible.

Brushless motors of the type described above have a defect as a result of the so-called cogging torque, to correct or reduce which, various technical solutions have been used, although these have led to various further defects, such as: loss of the magnetic flux when using the same active material; design complications; airborne noise and oscillations arising from geometric discontinuities; harmonics in the electromotive force which have a negative effect on the resultant active torque; and contradictory geometries/shapes arising from the requirement to produce a virtually sinusoidal electromotive force.

SUMMARY OF THE INVENTION

The present invention is based on the object of specifying a brushless motor whose cogging torque is less than one hundredth of the rated torque, and which at the same time allows the abovementioned defects to minimized.

The object is achieved by a brushless motor having the following features:

The motor has a rotor which can rotate about a rotation axis and has a specific number of magnetic poles which are distributed uniformly around the rotation axis and each extend along a slot pitch. Furthermore, the motor has a stator which is arranged coaxially with respect to the rotor and has three stator teeth for each two magnetic poles, which stator teeth are distributed uniformly around the rotation axis, with center points of mutually adjacent stator teeth being separated from one another by one slot pitch. The stator teeth have free surfaces which are opposite the magnetic poles, and each stator tooth is provided with a single projecting element which extends radially from the respective free surface in the direction of the rotor.

BRIEF DESCRIPTION OF THE DRAWINGS

Exemplary embodiments of the invention, which should not be regarded as constituting a restriction, are explained in more detail in the following text with reference to the figures, in which:

FIG. 5 shows a graph of the waveforms of the electromotive force and of the associated phase currents in the motors shown in FIGS. 2 and 4.

DETAILED DESCRIPTION OF THE PREFERRED EMBODIMENTS

Figure 1:
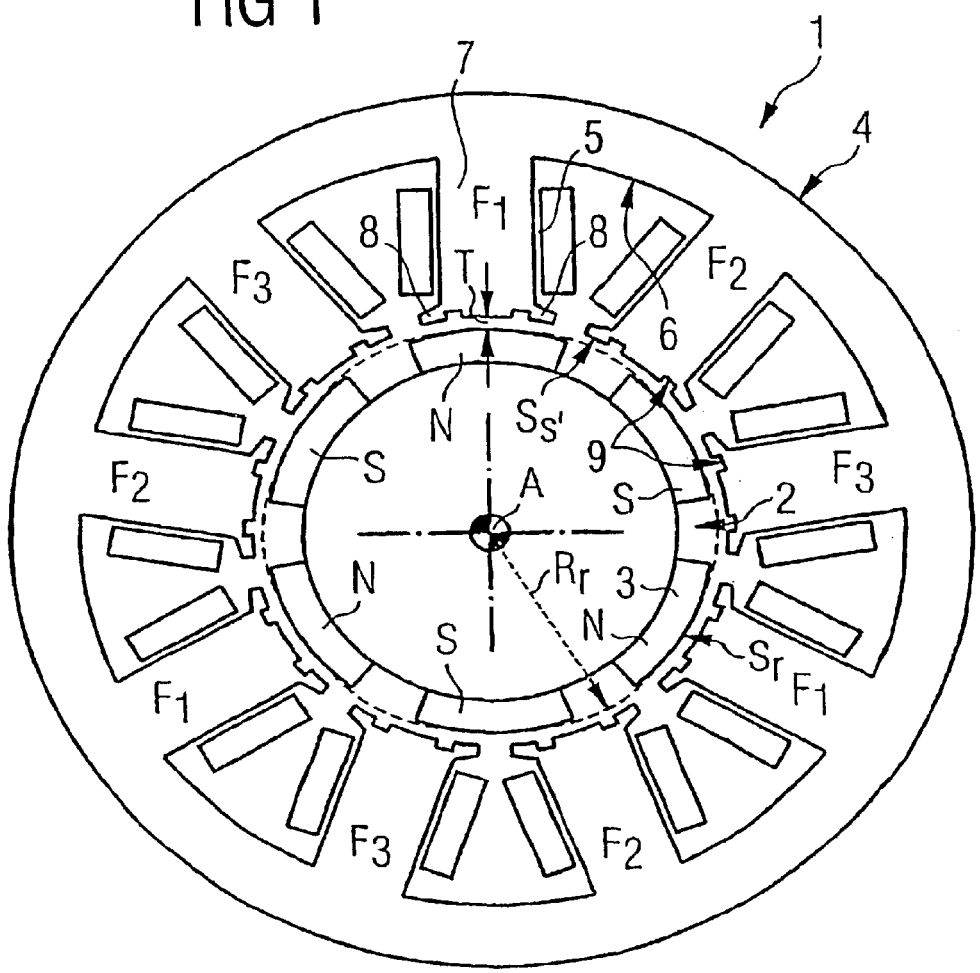
FIG. 1 shows a cross section through a brushless motor having permanent magnets according to the prior art.

In an example according to the prior art, a brushless motor 1 having permanent magnets 3 is provided, which brushless motor 1 has a rotor 2 which rotates around a rotation axis A and is enclosed radially by a cylindrical rotor surface S whose radius is Rr, and has a specific number N1 of permanent magnets 3 (see FIG. 1).

Furthermore, the motor 1 has a stator 4 which is mounted externally and coaxially around the rotor 2 and which has three stator teeth 5 for each two permanent magnets 3, which stator teeth 5 are distributed uniformly around the rotation axis A. The stator teeth 5 are separated from one another and form slots 6. The center points of mutually adjacent stator teeth are separated from one another by one slot pitch P. The stator teeth 5 have free surfaces Sus', which are opposite the surface Sr. The free surfaces S, and the surface Sr are separated from one another and form a constant-width gap T.

The motor 1 is designed as a three-phase motor having six permanent magnets 3, with which nine stator teeth 5 correspond and which are subdivided on the basis of phase windings into groups F1, F2, F3 distributed uniformly around the rotation axis A.

Each individual stator tooth 5 is provided with a phase winding. Each stator tooth 5 is essentially t-shaped and has a lengthened part 7, which is arranged along a radial line, and two vanes 8 at the ends, which extend from opposite regions of the part 7 transversely with respect to the part 7 itself and are radially bounded on the inside by the corresponding surface Sus'.

In order to reduce the cogging torque Cc, each stator tooth 5 of the motor 1 is provided with two slots 9 from the respective surface S'-As already mentioned, this measure leads not only to an increase in the production costs but also to a greater proportion of harmonics in the active torque, and to increased airborne noise in the motor with [lacuna] at the rotation speed.

Figure 2:
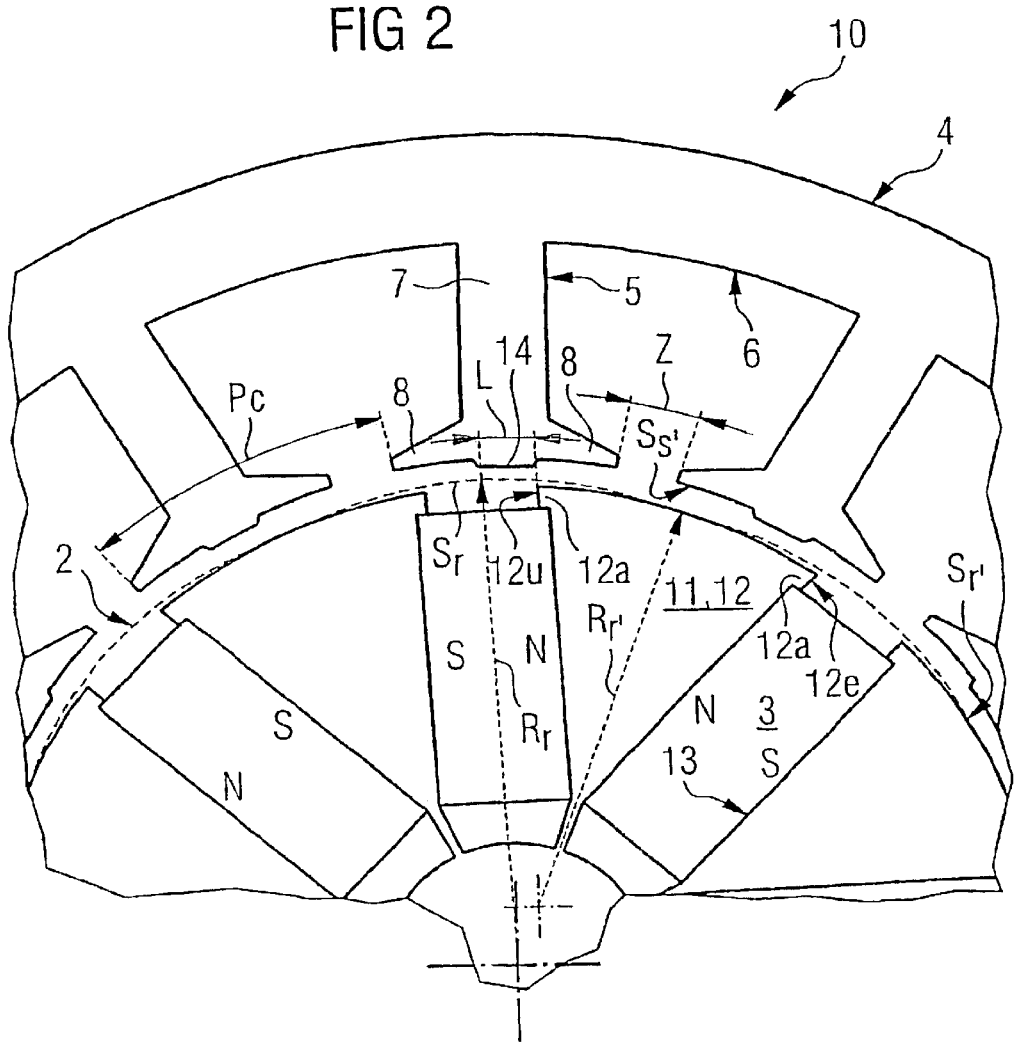
FIG. 2 shows a cross section through a part of a first brushless motor having permanent magnets.

In FIG. 2, the same reference numerals are used to represent the same and already described parts.

In one exemplary embodiment, a brushless threephase motor 10 having permanent magnets 3 is provided, which motor 10 has a rotor 2 which is mounted inside the stator 4.

However, it is within the scope of the invention for an opposite geometry to be used, in which the rotor 2 is arranged around the stator 4.

The rotor 2 contains a large number of laminations 11 which are packed/bundled together axially and form sectors. The sectors form seats 13, located between them, for the permanent magnets 3. Each sector is magnetized by the permanent magnets 3 in the two adjacent seats 13, and therefore forms a magnetic pole 12 for the rotor 2. Radially, the magnetic pole 12 is bounded by the associated surface Sr', whose radius of curvature Rr' is smaller than the radius Rr of the circumferential surface Sr in which the rotor 2 is itself enclosed. Each magnetic pole 12 extends along one slot pitch P and has two longitudinal teeth 12a on the opposite regions of its periphery along its surface Sr'. Opposite longitudinal teeth 12a of two adjacent magnetic poles 12 block the permanent magnet 3, which is arranged in between them, in the radial direction.

The longitudinal teeth 12a are bounded at the sides by side edges 12e and 12Ut which are located transversely with respect to the surface Sur'.

Instead of having to provide sectors, the magnetic poles may also be in the form of permanent magnets, as in the example from the prior art. In this case, the permanent magnets are located directly opposite the stator, and are bounded radially by the rotor surface Sr.

The ratio between the number N1 of permanent magnets 3 and the number N2 of stator teeth 5 in the motor 10, and the corresponding ratio in the example in the prior art, match one another and are invariably ⅔.

Each stator tooth 5 has a projecting element 14 which extends radially from the associated surface S in the direction of the rotor surface Sr.

Each projecting element 14 is in the form of a profiled tooth which is arranged in the center of the associated surface Sus'. The element 14 has a radial size which is optimized by computer using a magnetic optimization program, such that the cogging torque is as low as possible. Such a program may, for example, use the finite element method. The output from the optimization process is a specific minimum size, which corresponds to the minimum size of the gap T. This minimum size of the gap represents a standard, empirically determined size, which is about 0.5 mm in the field of automobile technology. The element 14 has a circumferential size L which corresponds to the distance Z between two stator teeth 5. The expression circumferential size in this case means the extent of the element 14 in the circumferential direction of the stator 4 (see FIG. 2). Each element 14 is in the form of an equilateral trapezoid, with the smaller base surface facing the rotor 2, and the circumferential size L being measured on the center line between the smaller base surface and the larger base surface.

The size and shape of each element 14 are optimized by computer using a magnetic optimization program, so that the interaction between a magnetic pole 12 and a specific element 14 produces a cogging torque Cc, whose magnitude is essentially identical to the cogging torque Cc which is produced by another magnetic pole 12 with a specific slot 6. Said cogging torques C have opposite mathematical signs. This applies both to the left-hand side edges 12u and to the right-hand side edges 12e of the longitudinal teeth 12a of the magnetic poles 12.

Figure 3A:
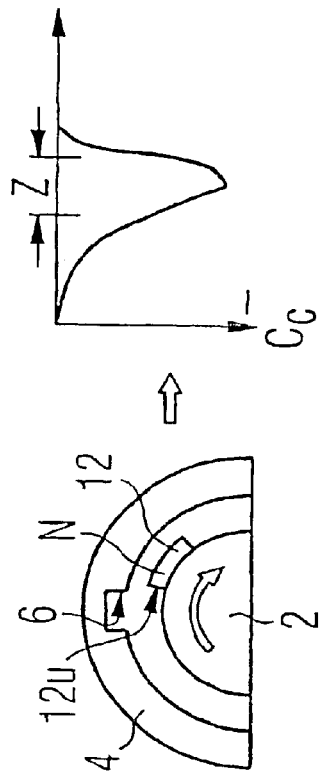
FIGS. 3a–3d show, schematically, four different operating conditions of the motor shown in FIG. 2, and the associated diagrams of the cogging torque for each of the operating conditions.
Figure 3B:
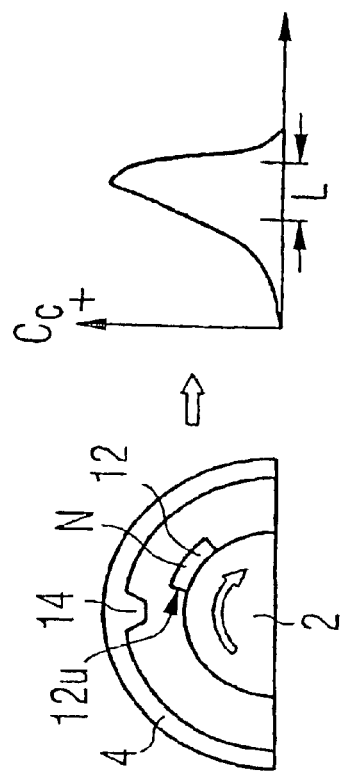
Figure 3C:
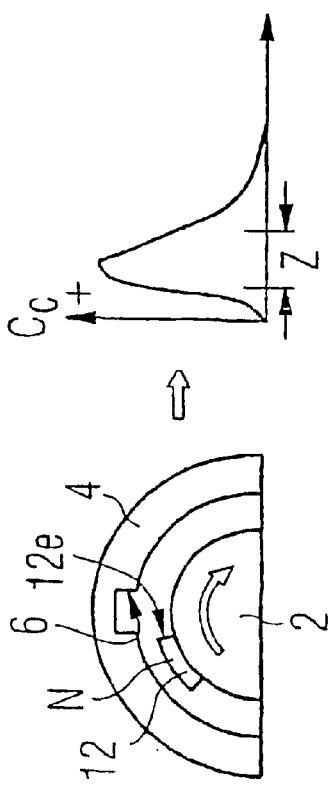
Figure 3D:
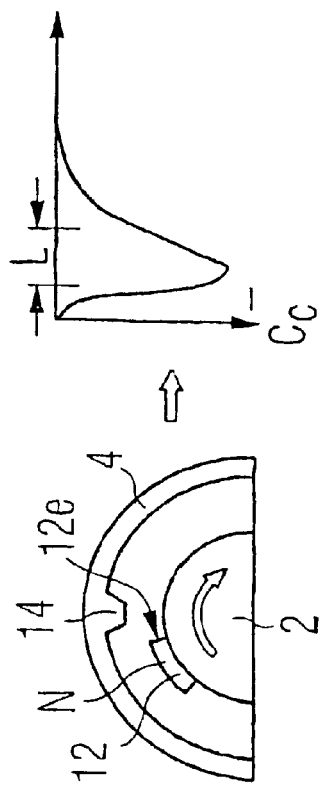

As shown in FIGS. 3a–3d, the cogging torque Cc can be produced under the four following basic conditions:

a) The side edge 12e of a magnetic pole 12 enters the region of the slot 6 (see FIG. 3a).

b) The side edge 12U of the same magnetic pole 12 emerges from the region of the slot (see FIG. 3b).

c) The side edge 12e of a magnetic pole 12 enters the region of the element 14 (see FIG. 3c).

d) The side edge 12U of the magnetic pole 12 from c) emerges from the region of the element 14 (see FIG. 3d).

If the profile of the cogging torques Cc are transferred as a function of the respective position of the magnetic pole 12 relative to the slot 6 and to the element 14 to a graph, it can be seen that there is a cogging torque Cc well above the opening of the slot 6, that is to say beyond the distance Z between two stator teeth 5 or the width L of the element 14, and that this is not symmetrical with respect to the slot axis or the element 14 itself.

The cogging torques Cc resulting from conditions a), b), c) and d) are additive. The design of the motor 10 described above leads to a situation in which the cogging torque C resulting from condition a) and the cogging torque Cc resulting from condition c) essentially cancel one another out. A corresponding situation applies to the cogging torque C resulting from condition b) and the cogging torque C resulting from condition d), with the overall result that the value of the cogging torque Cc of the motor 10 is less than the rated torque by a factor of about 100.

It can easily be seen that this result has been achieved by minimal change to a conventional brushless motor 1, but without in the process running into the difficulties encountered by conventional solution approaches.

Figure 4:
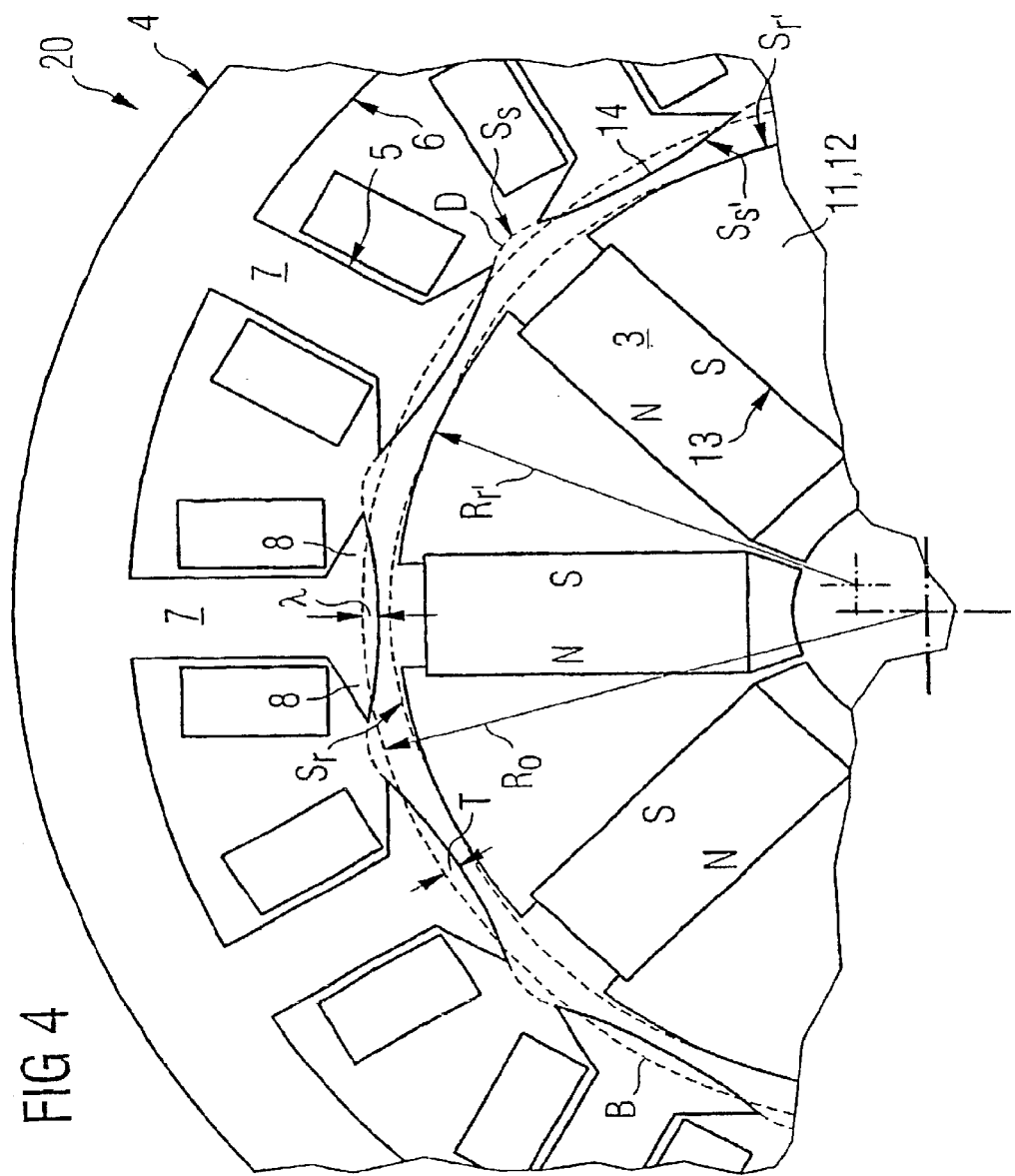
FIG. 4 shows a cross section through a part of a second brushless motor having permanent magnets.

The second exemplary embodiment, illustrated in FIG. 4, relates to a motor 20 which is essentially identical to the motor 10 except for the following differences: the projecting elements 14 define a cylindrical stator surface S which is interrupted between the stator teeth 5 and which describes a directrix D essentially having a cosine shape, with the directrix D oscillating about a reference circle B which runs concentrically around the rotation axis A.

The directrix D has a period which corresponds to one slot pitch P, defines a minimum size for the gap T at a central point on the surface Ssw of the relevant stator tooth 5, and runs, in polar coordinates, with a radius Ro about the reference circle B. The radius Ro is equal to the sum of the value of the radius of curvature Rr in which the rotor 2 is enclosed, the minimum size of the gap T, and the value of the amplitude X of the cosine function of the directrix D, optimized using a magnetic optimization program.

The particular shape of the surface S makes it possible to give the stator 4 a geometry by means of which, in comparison to the first exemplary embodiment, the geometric discontinuities caused by the slots 6 and the elements 14 illustrated in FIG. 2 are reduced.

Furthermore, the particular shape of the surface S makes it possible to reduce the airborne noise and to provide better control of the form of the electromotive force, so that it approximates to a sinusoidal curve with the same result in terms of the cogging torque Cc.

In addition to the abovementioned advantages, the proposed solutions result in the electromotive force having sinusoidal waveforms which mainly contain a fifth harmonic in antiphase to the fundamental of the electromotive force, and having an amplitude with values of less than 10% of the amplitude of the fundamental. Typical values for the amplitude are preferably in the order of magnitude of 6% of the amplitude of the fundamental.

The above statements will be found to be important if it is borne in mind that is possible to control the motor 10 using a (known but not illustrated) electronic bridge circuit with block commutation, which produces a sinusoidal current waveform in the phases of the motor, with a harmonic content, essentially consisting of the fifth harmonic, in phase with the fundamental and with an amplitude with typical values in the order of magnitude of 6% of the fundamental.

If the electromotive force is completely sinusoidal, this current waveform produces undesirable ripple in the active torque, that is to say a cogging torque. However, since the fifth harmonic of the electromotive force of the motor 10 is in antiphase to and in percentage terms, has a similar amplitude to the fifth harmonic in the waveform of the phase current, the negative effect of the ripple in the active torque is considerably reduced.

It is evident from this that, although the motor 10 does not make use of any highly developed and costly techniques for producing electromotive forces and sinusoidal supply voltages without any cogging movement in the active torque, cogging movements in the active torque with a very low percentage value can be achieved in comparison to the rated torque, that is to say the torque which the motor 10 is intended to emit.

In order to assist understanding, FIG. 5 shows typical waveforms of the electromotive force and the respective phase currents in a motor 10 with bridge control using square waves, in which the harmonic contents and the associated phases can be seen well.

The invention is not limited to the forms described and illustrated here, which should be regarded as exemplary embodiments of a brushless motor having permanent magnets, since changes relating to the shapes and arrangements of the parts, the design details and assembly can be carried out and can be combined with the idea of the invention.

What is claimed is:

1. A brushless motor,
   having a rotor which can rotate about a rotation axis and has a specific number of magnetic poles which are distributed uniformly around the rotation axis and each extend along a slot pitch;
   having a stator which is arranged coaxially with respect to the rotor and has three stator teeth for each two magnetic poles, which stator teeth are distributed uniformly around the rotation axis, with center points of mutually adjacent stator teeth being separated from one another by one slot pitch;
   wherein the stator teeth have free surfaces which are opposite the magnetic poles, and
   wherein each stator tooth is provided with a single projecting element which extends radially from the respective free surface in the direction of the rotor and wherein each projecting element essentially being in the form of an equilateral trapezoid, with the smaller base surface facing the rotor and the circumferential size being measured on the center line between the smaller and the larger base surface.

2. The motor as claimed in claim 1, with each projecting element being in the form of a profiled tooth, having an extent in the circumferential direction of the stator which corresponds essentially to the distance between two stator teeth, and having a radial size such that the cogging torque is as low as possible.

3. The motor as claimed in claim 1, with the projecting element being arranged in the center of the associated free surface.

4. The motor as claimed in claim 1, which is designed such that said motor has a sinusoidal electromotive force with a fifth harmonic whose phase is in antiphase to the fundamental of the electromotive force and whose amplitude is less than 10% of the amplitude of the fundamental.

5. The motor as claimed in claim 4, with the amplitude of the fifth harmonic being approximately 6% of the amplitude of the fundamental.

6. The motor as claimed in claim 1, with the rotor being located inside the stator.

7. The motor as claimed in claim 6, wherein the magnetic poles are bounded radially by a cylindrical rotor surface whose radius of curvature is smaller than the radius of curvature of a cylindrical surface which encloses the rotor.

8. The motor as claimed in claim 1, which contains a large number of laminations which are bundled together axially and form corresponding sectors as magnetic poles, two of which in each case form a seat for a permanent magnet.

9. A brushless motor,
   having a rotor which can rotate about a rotation axis and has a specific number of magnetic poles which are distributed uniformly around the rotation axis and each extend along a slot pitch;
   having a stator which is arranged coaxially with respect to the rotor and has three stator teeth for each two magnetic poles, which stator teeth are distributed uniformly around the rotation axis, with center points of mutually adjacent stator teeth being separated from one another by one slot pitch;
   wherein the stator teeth have free surfaces which are opposite the magnetic poles, and
   wherein each stator tooth is provided with a single projecting element which extends radially from the respective free surface in the direction of the rotor; and
   the projecting elements defining a cylindrical stator surface which is interrupted between the stator teeth and describes a directrix essentially having a cosine shape, with the directrix oscillating about a reference circle which runs concentrically around the rotation axis.

10. A brushless motor,
    having a rotor which can rotate about a rotation axis and has a specific number of magnetic poles which are distributed uniformly around the rotation axis and each extend along a slot pitch;
    containing a large number of laminations which are bundled together axially and form corresponding sectors as magnetic poles, two of which in each case form a seat for a permanent magnet;
    having a stator which is arranged coaxially with respect to the rotor and has three stator teeth for each two magnetic poles, which stator teeth are distributed uniformly around the rotation axis, with center points of mutually adjacent stator teeth being separated from one another by one slot pitch;
    wherein the stator teeth have free surfaces which are opposite the magnetic poles, and
    wherein each stator tooth is provided with a single projecting element which extends radially from the respective free surface in the direction of the rotor;
    whereby the projecting elements defining a cylindrical stator surface which is interrupted between the stator teeth and describes a directrix essentially having a cosine shape, with the directrix oscillating about a reference circle which runs concentrically around the rotation axis.

11. A brushless motor,
    having a rotor which can rotate about a rotation axis and has a specific number of magnetic poles which are distributed uniformly around the rotation axis and each extend along a slot pitch;

containing a large number of laminations which are bundled together axially and form corresponding sectors as magnetic poles, two of which in each case form a seat for a permanent magnet;

having a stator which is arranged coaxially with respect to the rotor and has three stator teeth for each two magnetic poles, which stator teeth are distributed uniformly around the rotation axis, with center points of mutually adjacent stator teeth being separated from one another by one slot pitch;

wherein the stator teeth have free surfaces which are opposite the magnetic poles, and wherein each stator tooth is provided with a single projecting element which extends radially from the respective free surface in the direction of the rotor;

whereby each projecting element essentially being in the form of an equilateral trapezoid, with the smaller base surface facing the rotor and the circumferential size being measured on the center line between the smaller and the larger base surface.

12. The motor as claimed in claim 11, with each projecting element being in the form of a profiled tooth, having an extent in the circumferential direction of the stator which corresponds essentially to the distance between two stator teeth, and having a radial size such that the cogging torque is as low as possible.

13. The motor as claimed in claim 11, with the projecting element being arranged in the center of the associated free surface.

14. The motor as claimed in claim 11, which is designed such that said motor has a sinusoidal electromotive force with a fifth harmonic whose phase is in antiphase to the fundamental of the electromotive force and whose amplitude is less than 10% of the amplitude of the fundamental.

15. The motor as claimed in claim 14, with the amplitude of the fifth harmonic being approximately 6% of the amplitude of the fundamental.

16. The motor as claimed in claim 11, with the rotor being located inside the stator.

17. The motor as claimed in claim 16, wherein the magnetic poles are bounded radially by a cylindrical rotor surface whose radius of curvature is smaller than the radius of curvature of a cylindrical surface which encloses the rotor.

* * * * *